US008125609B2

(12) United States Patent
Ahn (10) Patent No.: US 8,125,609 B2
(45) Date of Patent: Feb. 28, 2012

(54) IN-PLANE SWITCHING MODE LIQUID CRYSTAL DISPLAY DEVICE WITH MULTI-LAYER ELECTRODE AND FABRICATION METHOD THEREOF

(75) Inventor: Ji Young Ahn, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 173 days.

(21) Appl. No.: 11/027,990

(22) Filed: Jan. 4, 2005

(65) Prior Publication Data

US 2005/0200791 A1  Sep. 15, 2005

(30) Foreign Application Priority Data

Mar. 11, 2004  (KR) .................. 10-2004-0016641

(51) Int. Cl.
*G02F 1/13* (2006.01)
*G02F 1/1335* (2006.01)
*G02F 1/1343* (2006.01)

(52) U.S. Cl. .......... 349/187; 349/43; 349/144; 349/141; 349/147

(58) Field of Classification Search .................. 349/147, 349/43, 114, 141, 187
See application file for complete search history.

(56) References Cited

U.S. PATENT DOCUMENTS

| 5,667,853 A | 9/1997 | Fukuyoshi et al. | |
|---|---|---|---|
| 5,745,207 A * | 4/1998 | Asada et al. | 349/141 |
| 6,563,554 B2 * | 5/2003 | Okamoto et al. | 349/12 |
| 6,747,723 B2 * | 6/2004 | Hanakawa et al. | 349/147 |
| 2001/0046017 A1 | 11/2001 | Niwano et al. | |
| 2003/0107037 A1 * | 6/2003 | Youn et al. | 257/59 |
| 2003/0142259 A1 * | 7/2003 | Asai et al. | 349/141 |
| 2004/0024524 A1 * | 2/2004 | Miyazawa | 701/211 |
| 2004/0027524 A1 * | 2/2004 | Shiota et al. | 349/129 |
| 2004/0207792 A1 * | 10/2004 | Wu | 349/141 |
| 2006/0050193 A1 * | 3/2006 | Seki et al. | 349/44 |

FOREIGN PATENT DOCUMENTS

| JP | 7-64112 A | 3/1995 |
|---|---|---|
| JP | 09-269508 A | 10/1997 |
| JP | 11-119237 A | 4/1999 |
| JP | 2000-028993 A | 1/2000 |
| JP | 2001-264804 A | 9/2001 |
| JP | 2002-090779 A | 3/2002 |
| JP | 2002-139737 A | 5/2002 |
| JP | 2003-43509 A | 2/2003 |
| KR | 10-2001-0106862 A | 12/2001 |
| KR | 10-2002-0005899 A | 1/2002 |
| TW | 496985 B | 8/2002 |

* cited by examiner

*Primary Examiner* — Nathanael R Briggs
(74) *Attorney, Agent, or Firm* — Birch, Stewart, Kolasch & Birch, LLP (57) ABSTRACT

An IPS (In-Plane Switching) mode LCD (Liquid Crystal Display) includes first and second substrates facing each other; a plurality of gate lines and data lines arranged in a matrix configuration on the first substrate and defining a plurality of pixel regions; at least one common electrode and one pixel electrode alternatingly disposed at the pixel region to generate a horizontal electric field, at least one of them having a structure of a dual layer; and a liquid crystal layer formed between the first and second substrates.

3 Claims, 9 Drawing Sheets

IN-PLANE SWITCHING MODE LIQUID CRYSTAL DISPLAY DEVICE WITH MULTI-LAYER ELECTRODE AND FABRICATION METHOD THEREOF

This application claims the priority benefit of the Korean Patent Application No. 10-2004-0016641 filed on Mar. 11, 2004, which is hereby incorporated by reference.

BACKGROUND OF THE INVENTION

1. Field of the Invention

The present invention relates to an in-plane switching (IPS) mode LCD (Liquid Crystal Display) device and, more particularly, to an IPS mode LCD device in which a common electrode and a pixel electrode are formed as a dual layer of a transparent electrode and an opaque electrode, and to the fabrication method of the IPS mode LCD device.

2. Description of the Related Art

Recently, as interests on information displays and demands for using a portable (mobile) information medium are increasing, research on and commercialization of a light thin film type flat panel display (FPD), which can substitute the existing display device CRT, are actively ongoing.

Among the FPDs, in particular, an LCD, a device for expressing an image by using an optical anisotropy of liquid crystal, exhibits excellent resolution, color display and picture quality, so it is actively applied for a notebook, a desktop monitor or the like.

A twisted nematic (TN) mode is one of driving methods generally used for the LCD device, wherein liquid crystal molecules on nematic are driven in a vertical direction to a substrate. The TN mode LCD is, however, disadvantageous in that its viewing angle is some 90°, which is quite narrow. This results from a refractive anisotropy of liquid crystal molecules. That is, when a voltage is applied to the liquid crystal display panel, liquid crystal molecules aligned horizontally to the substrate are aligned nearly vertical to the substrate.

Thus, there has been proposed an IPS mode which improves the viewing angle by more than 170° by driving the liquid crystal molecules horizontally to the substrate, which will now be described in detail.

Figure 1:
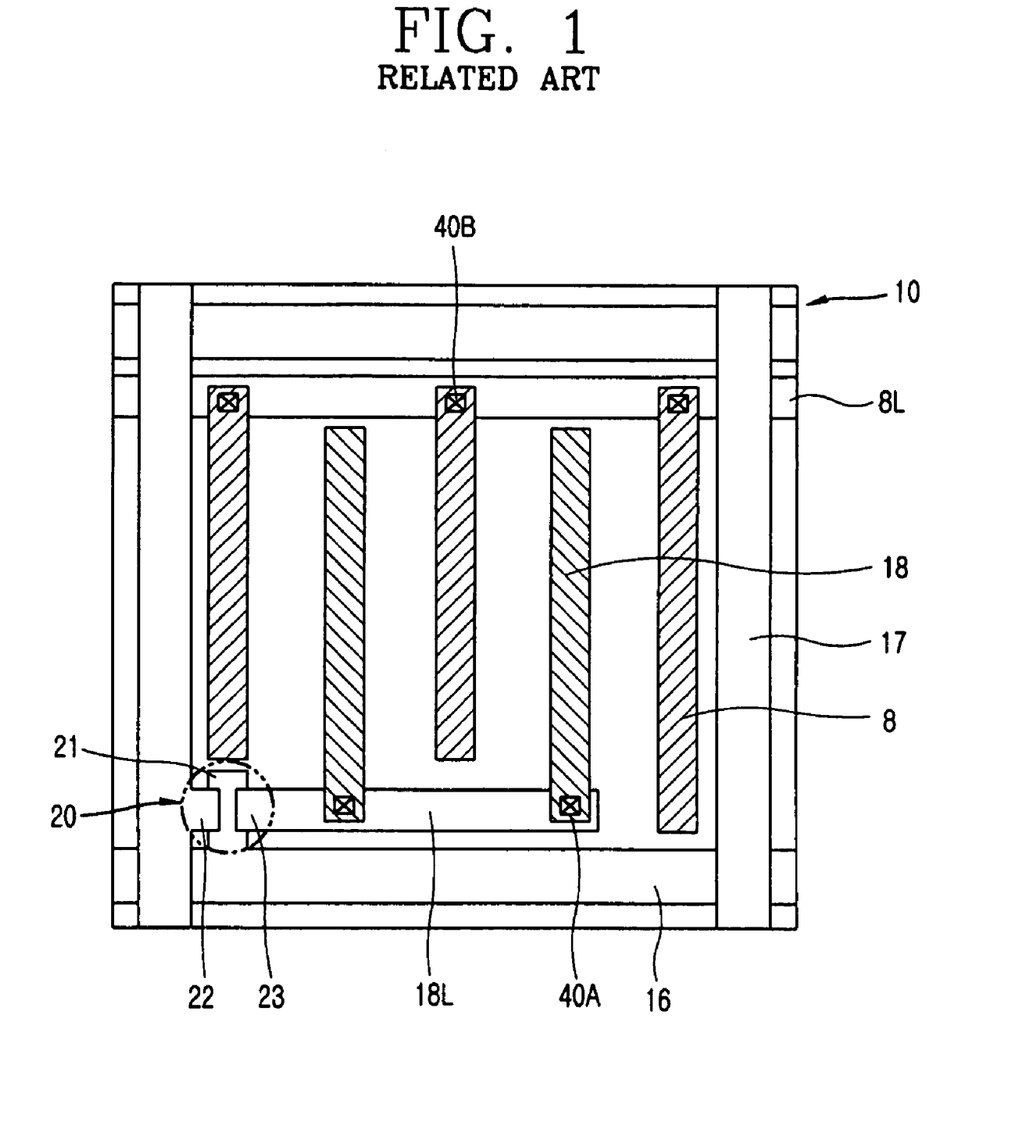
FIG. 1 is a plan view showing a portion of an array substrate of a general IPS mode LCD.

FIG. 1 is a plan view showing a portion of an array substrate of an IPS mode LCD according to a related art. Generally, in the LCD, a N-number of gate lines and a M-number of data lines cross each to form a N×M number of pixels, but for the sake of explanation, only one pixel is shown in FIG. 1.

As shown in FIG. 1, a gate line 16 and a data line 17 defining a pixel region are arranged vertically and horizontally on a transparent glass substrate 10, and a thin film transistor (TFT) 20 (a switching device) is formed at the crossing of the gate line 16 and the data line 17.

The TFT 20 includes a gate electrode 21 connected to the gate line 16, a source electrode 22 connected to the data line 17 and a drain electrode 23 connected to a pixel electrode line 18L. The TFT 20 also includes an insulation film (not shown) for insulating the gate electrode 21 and the source/drain electrodes 22 and 23, and an active layer (not shown), namely, a channel layer, for forming a conductive channel between the source and drain electrodes 22 and 23 by a gate voltage supplied to the gate electrode 21.

In the pixel region, a common electrode 8 and a pixel electrode 18 for generating horizontal electric field are alternatingly disposed in a longitudinal direction of the data line 17.

At this time, the pixel electrode 18 is electrically connected with the pixel electrode line 18L connected to the drain electrode 23 through a first contact hole 40A, and the common electrode 8 is electrically connected with a common electrode line 8L disposed in parallel to the gate line 16 through a second contact hole 40B.

The common electrode 8 and the pixel electrode 18 made of a transparent conductive material such as indium tin oxide (ITO) are formed on the same plane.

The in-plane mode LCD with the 2ITO structure in which the pixel electrode and the common electrode are all formed as transparent electrodes, has advantages in that since the electrodes in the pixel region (an image display region) are formed as the transparent electrodes, an aperture ratio is increased, and since the two types of electrodes are formed on the same plane, the interval between the electrodes is uniform, thereby providing a good response speed and a residual image.

However, the in-plane mode LCD with the 2ITO structure has a problem in that since the electrodes are made of the transparent material, they do not exhibit complete black luminance in a normally black mode and thus a contrast ratio of a screen is not good.

In fabricating a liquid crystal display panel, the larger the panel becomes, the resistance of the electrodes increases which in turn affects the picture quality. In this respect, changing the structure of the existing design of the LCD cannot solve the resistance problem. In particular, the resistance of the transparent electrodes creates a big problem. If the electrodes are made thick in order to lower the resistance of the electrodes, the liquid crystal molecules manifest abnormal behavior due to a step according to the thickness of the electrodes, thereby degrading the picture quality, e.g., due to light leakage.

SUMMARY OF THE INVENTION

Therefore, an object of the present invention is to provide an in-plane switching (IPS) mode liquid crystal display (LCD) capable of reducing resistance and enhancing a contrast ratio of a screen by forming a common electrode and a pixel electrode as a dual layer of transparent electrode and to provide opaque electrode, and a fabrication method of such LCD.

To achieve these and other advantages and in accordance with the purpose of the present invention, as embodied and broadly described herein, according to an aspect of the present invention there is provided an IPS mode LCD including: first and second substrates which are facing each other; a plurality of gate lines and data lines arranged vertically and horizontally on the first substrate and defining a plurality of pixel regions; at least one common electrode and one pixel electrode alternately disposed at the pixel region to generate a horizontal electric field, at least one of them having a structure of a dual layer; and a liquid crystal layer formed between the first and second substrates.

To achieve the above and other objects, according to an aspect of the present invention there is also provided a method for fabricating an IPS mode LCD including: providing first and second substrates; forming a gate electrode and a gate line on the first substrate; forming a first insulation film on the first substrate; forming an active layer at a certain region of the first substrate; forming source/drain electrodes on the active layer and forming data lines crossing the gate lines to define a pixel region; forming a second insulation film on the first substrate; forming at least one common electrode and one pixel electrode on the second insulation layer to form a horizontal electric field, at least one of them having a dual layer structure; forming a third insulation film on the first substrate; and attaching the first and second substrates.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

The IPS mode LCD and its fabrication method in accordance with preferred embodiments of the present invention will now be described.

Figure 2:
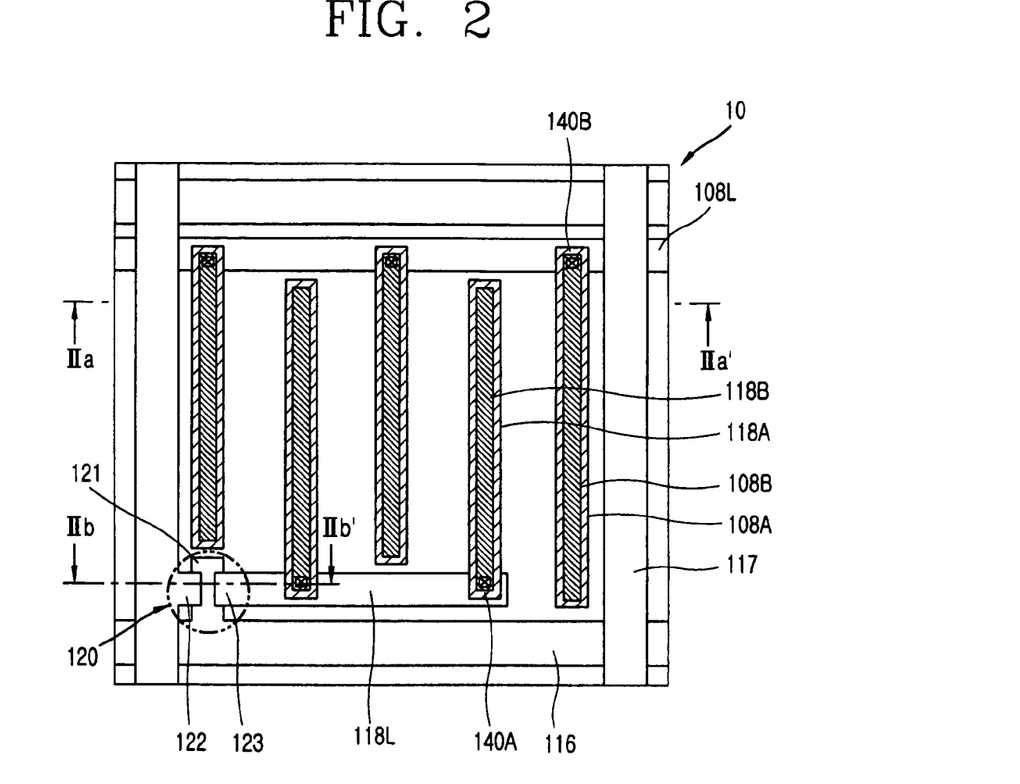
FIG. 2 is a plan view showing a portion of an array substrate of an IPS mode LCD in accordance with a first embodiment of the present invention.

FIG. 2 is a plan view showing a portion of an array substrate of an IPS mode LCD in accordance with a first embodiment of the present invention. In the LCD, a N-number of gate lines and a M-number of data lines cross to form a N×M number of pixels, but for the sake of explanation and clarity, only one pixel is shown in FIG. 2.

As shown in FIG. 2, a gate line 116 and a data line 117 are arranged vertically and horizontally to form a pixel region on a transparent glass substrate 110. A thin film transistor (TFT) 120 (a switching device) is formed at the crossing of the gate line 116 and the data line 117.

The TFT 120 includes a gate electrode 121 connected to the gate line 116, a source electrode 122 connected to the data line 117, and a drain electrode 123 connected to a pixel electrode line 118L. The TFT 120 also includes an insulation film for insulating the gate electrode 121 and the source/drain electrodes 122 and 123, and an active layer (a channel layer) for forming a conductive channel between the source and drain electrodes 122 and 123 by a gate voltage supplied to the gate electrode 121.

In the pixel region, a dual layer of common electrode 108A and 108B and a dual layer of pixel electrode 118A and 118B for generating a horizontal electric field are alternatingly disposed.

Particularly, the pixel electrode 118A and 118B is electrically connected with the pixel electrode line 118L connected to the drain electrode 123 through a first contact hole 140A, and the common electrode 108A and 108B is electrically connected with a common electrode line 108L disposed in parallel to the gate line 116 through a second contact hole 140B.

The common electrode 108A and 108B and the pixel electrode 118A and 118B are shown to be formed as a dual layer made of a conductive material. But the present invention is not limited thereto and the common electrode 108A and 108B and the pixel electrode 118A and 118B can be formed as a triple (or greater number) layer made of a conductive material, or only one of the common electrode 108A and 108B and the pixel electrode 118A and 118B can be formed as a dual layer (or a triple layer or greater number layer) made of a conductive material.

At least one kind of the conductive material forming the common electrode 108A and 108B and the pixel electrode 118A and 118B can be an opaque material, and at least one kind can be a transparent conductive material such as an indium-tin-oxide which is not easily oxidized even when the surface is exposed. In addition, at least one kind of the conductive material of the dual (or greater number) layer can be a conductive material with specific resistance which is low as to be used as the pixel electrode or common electrode.

It is shown that the dual layer has such a structure in that a transparent electrode is used for the first common electrode 108A and the first pixel electrode 118A positioned at a lower side, and an opaque electrode is used for the second common electrode 108B and the second pixel electrode 118B formed at an upper side thereof on the respective electrode 108A/118A. The opaque electrode 108B and 118B may have a width smaller than that of the transparent electrodes 108A and 118A as shown in FIG. 3, but the present invention is not limited thereto.

The common electrode 108A and 108B and the pixel electrode 118A and 118B formed as the dual layer will be described in detail through a section of the LCD as follows.

Figure 3:
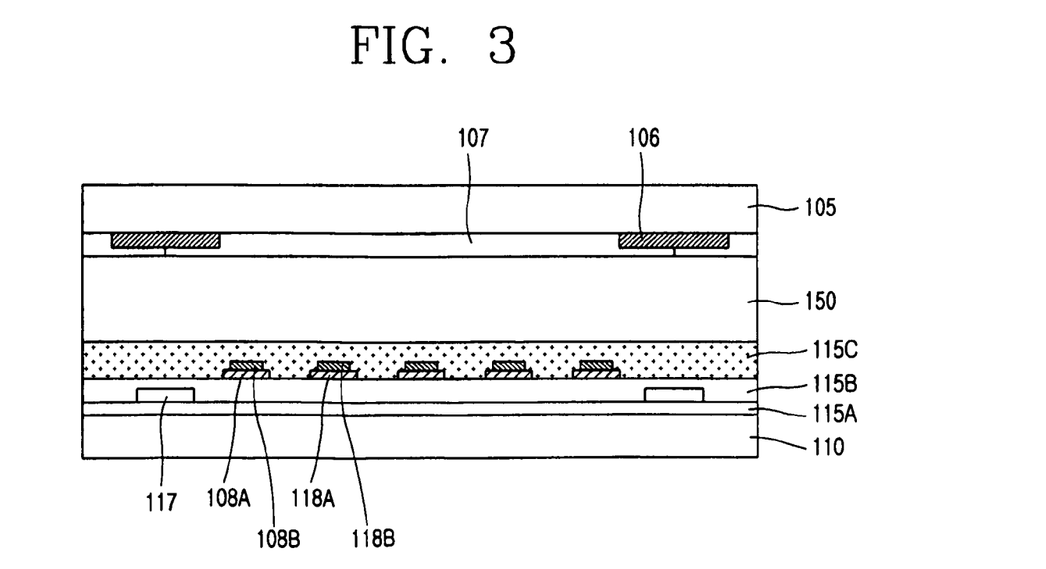
FIG. 3 is a sectional view taken along line IIa-IIa' of the LCD of FIG. 2.

FIG. 3 is a sectional view taken along line IIa-IIa' of the LCD of FIG. 2, showing an array substrate of FIG. 2 and a color filter substrate corresponding to the array substrate.

As shown, the LCD includes a color filter substrate 105, an array substrate 110 and a liquid crystal layer 150 formed between the color filter substrate 105 and the array substrate 110.

A color filter 107 having R, G and B sub-color filters implementing color and a black matrix 106 for dividing the sub-color filters and blocking a light against the liquid crystal layer 150, are formed on the color filter substrate 105.

In addition, a first insulation film 115A is formed at the entire surface of the array substrate 110 and the data line 117 is formed at a position corresponding to the black matrix 106 of the color filter substrate 105, on the first insulation film 115A.

A second insulation film 115B is formed on the first insulation film 115A including the data line 117, and the common electrode 108A and 108B and the pixel electrode 118A and 118B, which are formed as a dual layer, are alternatingly disposed at an image display region on the second insulation film 115B. A third insulation film 115C is formed at the entire surface of the substrate 110 including the common electrode 108A and 108B and the pixel electrode 118A and 118B.

The common electrode 108A and 108B and the pixel electrode 118A and 118B are each formed as a dual layer composed of the first electrode 108A or 118A (the lower electrode) made of a transparent conductive material and the second electrode 108B or 118B (the upper electrode) made of an opaque conductive material. The second electrodes 108B and 118B are formed narrower than the first electrodes 108A and 118A so as to be advantageous in the aspect of a contrast ratio and luminance of a screen. This will now be described in detail with reference to FIGS. 4A and 4B as follows.

Figure 4A:
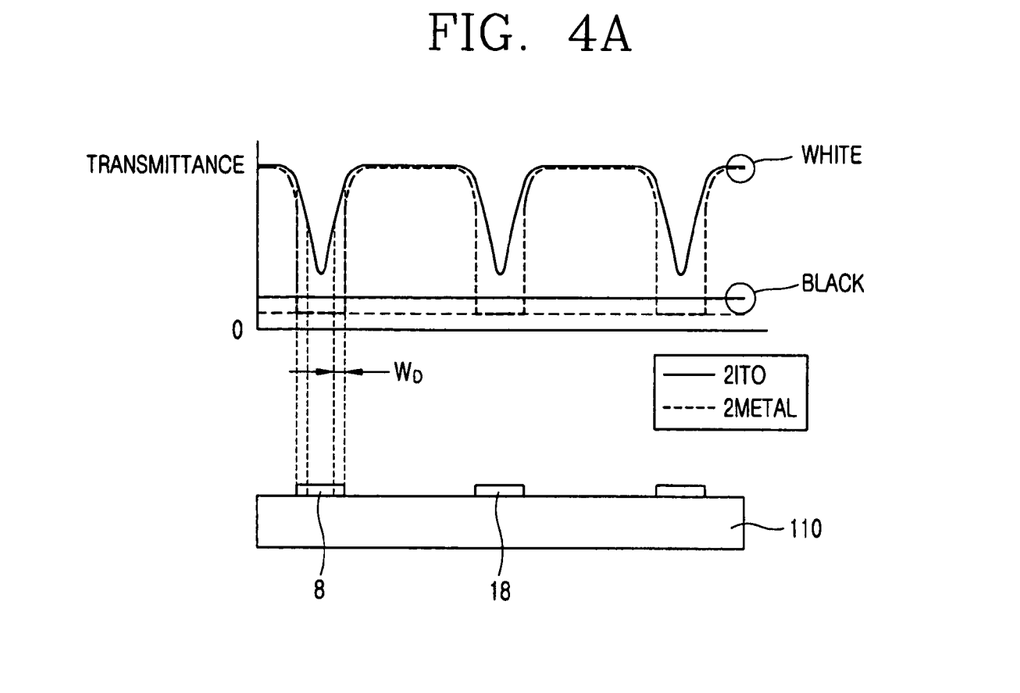
FIGS. 4A and 4B are graphs showing transmittance characteristics according to an electrode structure.
Figure 4B:
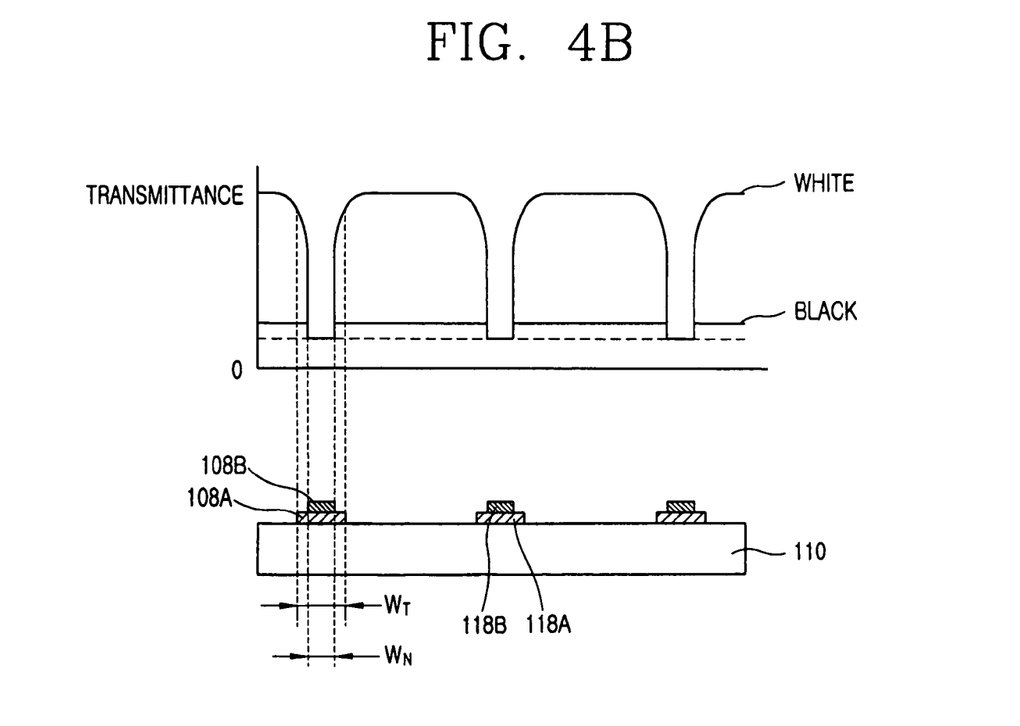

FIGS. 4A and 4B are graphs showing transmittance characteristics according to an electrode structure and black and white luminance in a black mode.

In the graph of FIG. 4A, the solid line indicates transmittance characteristics of an IPS mode LCD with the 2ITO structure as described above according to the related art, and the dotted line indicates transmittance characteristics of an IPS mode LCD with a 2-metal structure in which the pixel electrode and the common electrode are both made of an opaque material according to the related art.

As shown, in the 2ITO structure, regardless of where the common electrode 8 and the pixel electrode 18 are positioned, the entire region fails to show a complete black luminance, but in the 2-metal structure, since the electrodes 8 and 18 are opaque, a complete black luminance is made at the positions of the electrodes 8 and 18.

In the 2-metal structure, light cannot be transmitted through the region where the electrodes 8 and 18 are formed, so white luminance at the region is 0. But in the 2ITO structure, some amount of light is transmitted through the region, showing the transmittance characteristics as shown. Thus, according to the transmittance characteristics of the black luminance and the white luminance, the 2ITO structure is superior to the 2-metal structure in the aspect of the luminance.

Meanwhile, the contrast ratio of the screen is a barometer which determines how clearly an image can be shown on the screen, and the larger the luminance difference is, the more clearly the image is shown. The contrast ratio is defined as a value obtained by dividing a value of the white luminance by luminance in a black state at the center of the front surface of the panel.

The luminance in the black state has a smaller value than the luminance in the white state, so the value of the contrast value is much influenced mainly by the black luminance. Thus, the 2ITO structure is disadvantageous compared to the 2-metal structure in the aspect of the contrast ratio.

In FIG. 4A, the width $W_D$ indicates a region of the transparent electrode, which mainly affects the increase in the white luminance in the 2ITO structure and it is noted that a region of the transparent electrode (namely, the central region of the transparent electrode) wider than the width $W_D$ does not affect the increase in the luminance.

FIG. 4B is a graph showing transmittance characteristics of the IPS mode LCD with the dual-layer electrode structure according to the present invention.

As shown, the transmittance of the black luminance at the region where the opaque electrode 108B and 118B (as wide as the width ($W_N$) of the opaque electrode 108B and 118B) are formed is 0 and the white luminance has the same form as the white luminance of the 2-metal structure, except for the width ($W_N$).

In other words, the dual-layer electrode structure according to the present invention wherein the transparent electrodes 108A and 118A and the opaque electrode 108B and 118B are formed as a dual layer, has the merits of luminance of the 2ITO structure and the merits of the screen contrast ratio of the 2-metal structure. In particular, the opaque electrodes 108B and 118B are formed to have a smaller width ($W_N$) than the transparent electrodes 108A and 118A. This is because the merits of the 2ITO structure affect the region from the edge of the transparent electrodes 108A and 118A to a certain width (namely, $W_T$), so the opaque electrodes 108B and 118B for enhancing the screen contrast ratio are formed at the central portion.

In the dual layer electrode structure, the common electrode and the pixel electrode are each formed as a dual layer of the transparent electrode and the opaque electrode, so that the screen contrast ratio and luminance are both enhanced using the merits of the IPS mode LCD with the 2ITO structure.

In addition, since the opaque electrode is added, a chuck stain deficiency possibly generated in the 2ITO structure can be prevented. The chuck stain is generated as a light is reflected at a chuck portion of a metal material for fixing the substrate during a photoresist film exposing process for patterning the transparent electrode.

In addition, since the opaque electrode having lower resistance than the 2ITO structure is added, the electrode part resistance is reduced. Accordingly, the thickness of the electrode part is reduced, and thus, the picture quality deficiency due to a step can be prevented A process for fabricating the IPS mode LCD with the dual-layer structure according to the present invention will now be described in detail with reference to FIGS. 5A to 5D and 6A to 6E.

FIGS. 5A to 5D are sequential sectional views taken along line IIa-IIa' of FIG. 2 showing a fabrication process in which a dual layer of a lower electrode made of a transparent conductive material and an upper electrode made of an opaque conductive material is constructed. FIGS. 6A to 6E are sequential sectional views taken along line IIb-IIb' of FIG. 2 showing a fabrication process of the TFT according to the present invention.

Figure 5A:
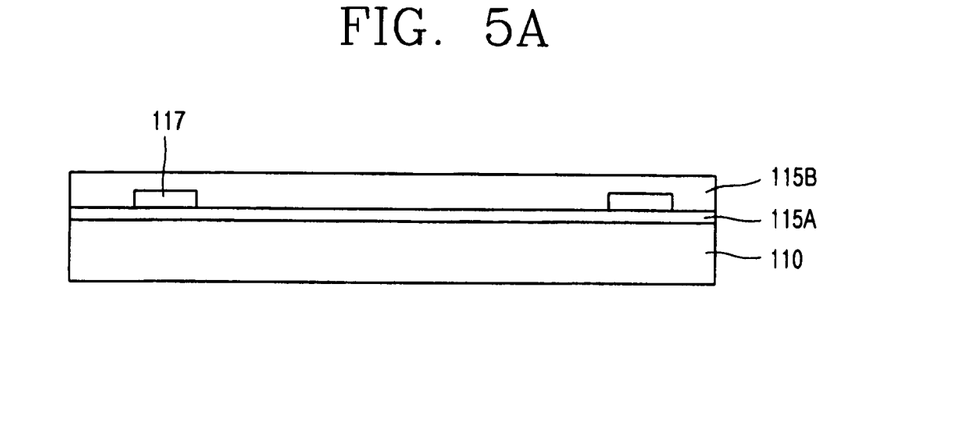
FIGS. 5A to 5D are sequential sectional views taken along line IIa-IIa' of FIG. 2 showing a fabrication process according to the present invention.
Figure 6A:
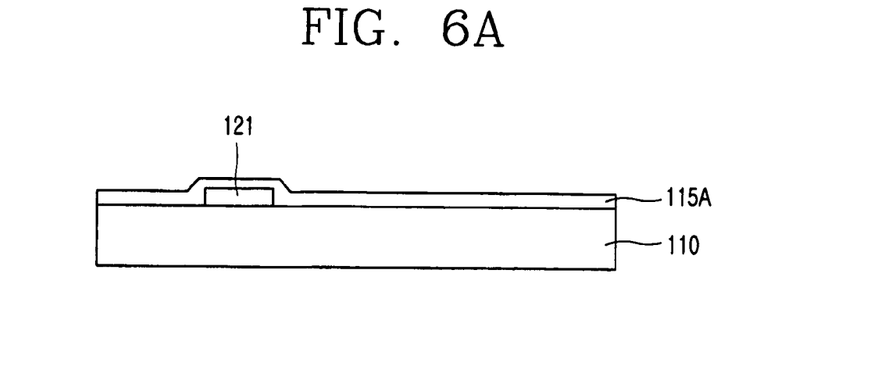
FIGS. 6A to 6E are sequential sectional views taken along line IIb-IIb' of FIG. 2 showing a fabrication process according to the present invention.

First, as shown in FIG. 5A, a first insulation film 115A is formed on a substrate 110 made of a transparent insulation material such as glass. In this case, the first insulation film 115A is a gate insulation film, and as shown in FIG. 6A, after a gate electrode 121 is formed on the substrate 110 and then the first insulation film 115A is formed at the entire surface of the substrate 110 including the gate electrode 121.

Figure 6B:
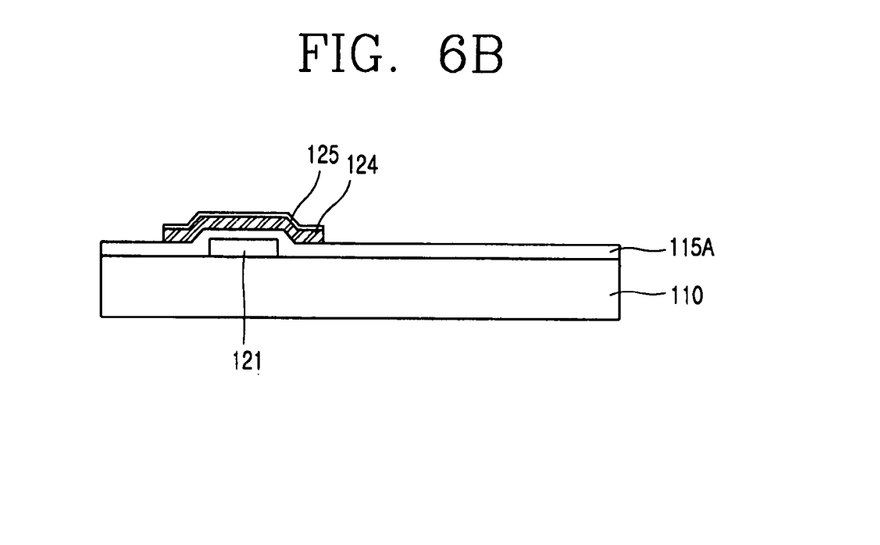

Next, as shown in FIG. 6B, an amorphous silicon thin film and an n+ amorphous silicon thin film are deposited in turn at the entire surface of the substrate 110 with the first insulation film 115A formed thereon, and then, patterned by using a photolithography process to form an active pattern 124 at an element region. At this time, the patterned n+ amorphous forms an ohmic-contact layer 125.

Figure 6C:
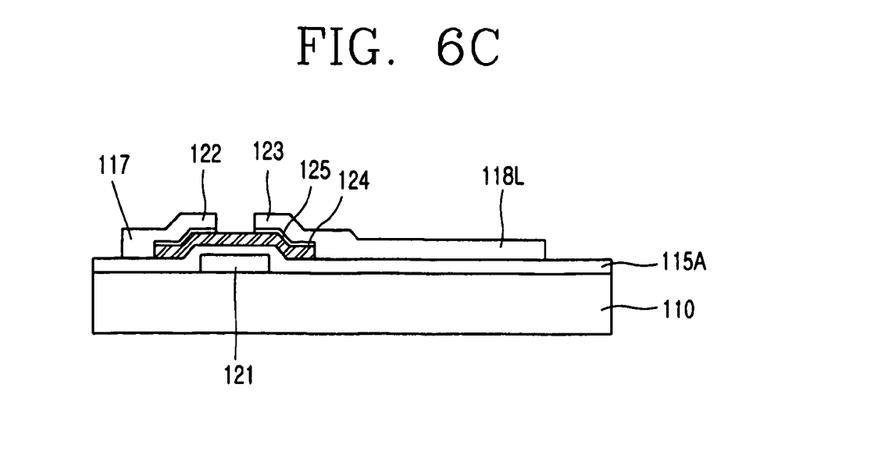

As shown in FIG. 6C, a conductive metal material is deposited at the entire surface of the substrate 110 and then patterned by using the photolithography process to form a source electrode 122 and a drain electrode 123 at the element region.

Thereafter, the ohmic-contact layer 125 is removed by using the source/drain electrodes 122 and 123 as a mask to expose a portion of the active pattern 124. At this time, a portion of the source electrode 1222 is extended to form a data line 117, and a portion of the drain electrode 123 is extended to a pixel region to form a pixel electrode line 118L.

Figure 6D:
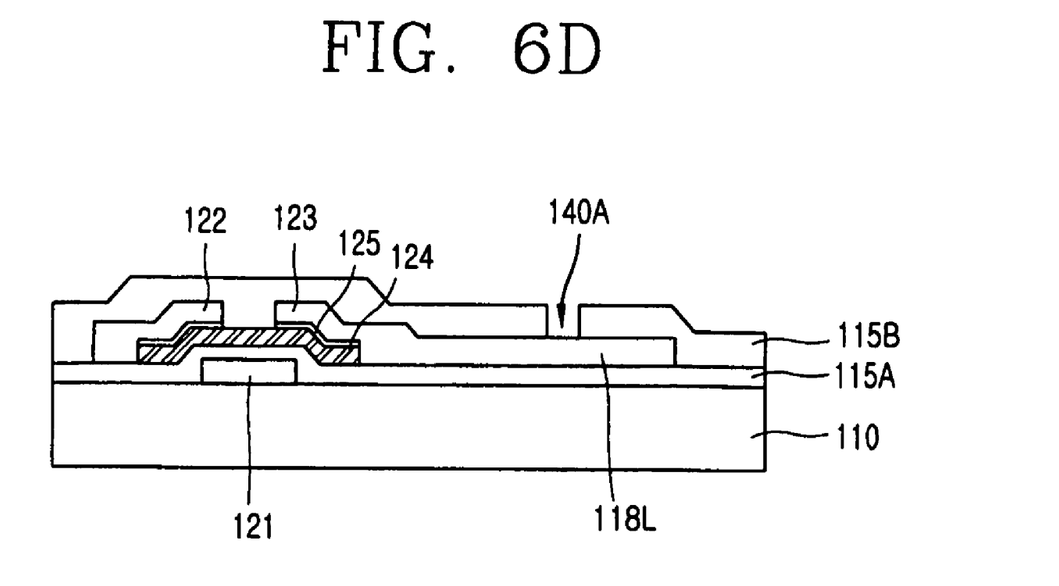

Next, as shown in FIG. 6D, a second insulation film 115B is deposited at the entire surface of the substrate 110 and then a portion of the second insulation film 115B is removed through the photolithography process to form a first contact hole 140A exposing a portion of the pixel electrode line 118L.

Figure 5B:
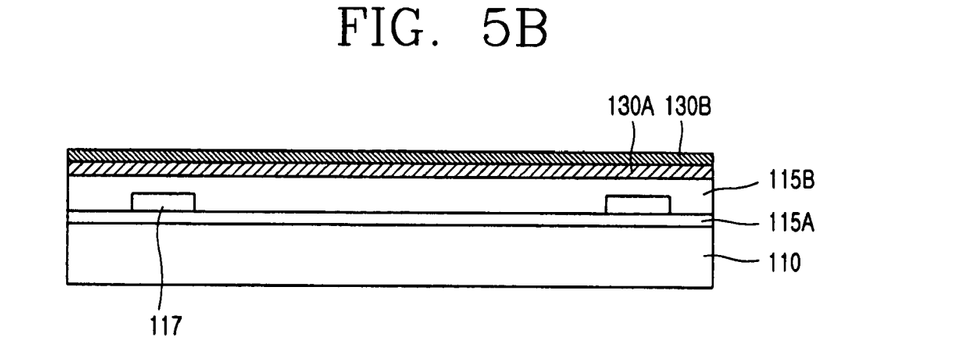

After the TFT is formed at the element region as shown in FIG. 6D, in order to form an electrode of a dual layer for generating a horizontal electric field, as shown in FIG. 5B, a first conductive metal layer 130A and a second conductive metal layer 130B are formed in turn at the entire surface of the substrate including the second insulation film 115B.

In a preferred embodiment of the present invention, the first conductive metal layer 130A is made of a transparent conductive material such as indium-tin-oxide, indium-zinc-oxide (IZO) or indium-tin-zinc-oxide (ITZO) or the like, and the second conductive metal layer 130B is made of an opaque conductive material made of molybdenum (Mo), aluminum (Al), aluminum-neodiminium (AlNd), copper (Cu), chrome (Cr), tungsten (W), titanium (Ti) or their alloy or formed as a multi-layer having one or more such elements. But, the present invention is not limited thereto and the first conductive metal layer 130A and the second conductive metal layer 130B can be changed as needed.

Figure 5C:
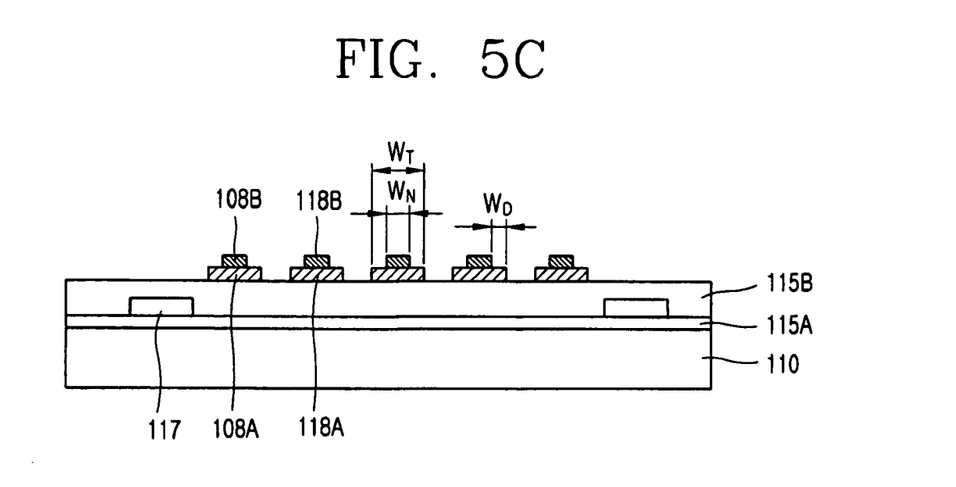
Figure 6E:
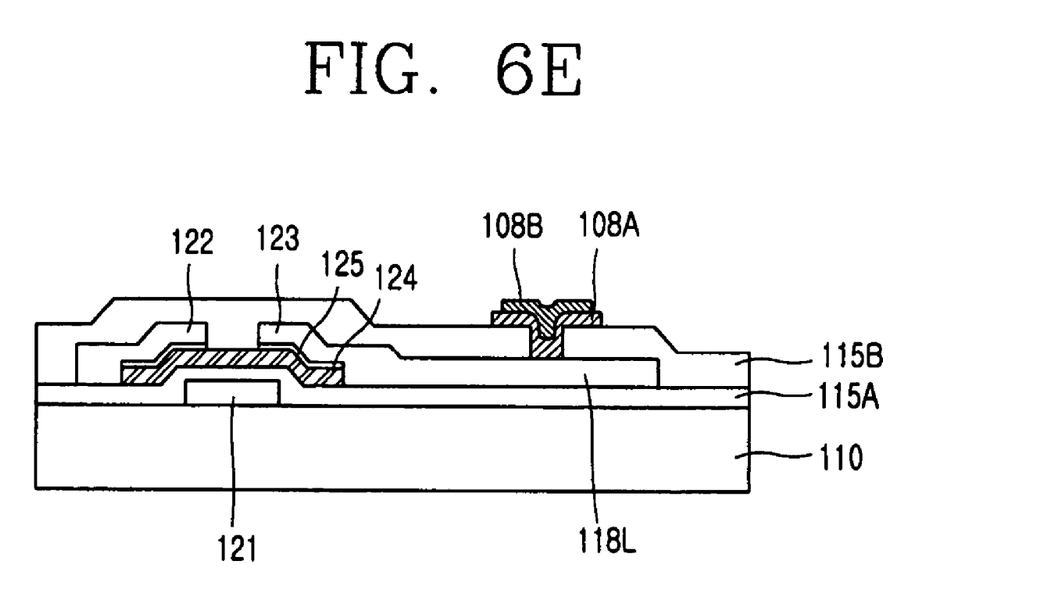

And then, as shown in FIGS. 5C and 6E, the second conductive metal layer 130B and the first conductive metal layer 130A are patterned to form common electrodes 108A and 108B and pixel electrodes 118A and 118B which are alternatingly disposed at the pixel region.

The common electrodes 108A and 108B and the pixel electrode 118A and 118B are each formed as a dual layer of conductive material(s). The first common electrode 108A and the first pixel electrode 118A are formed as a lower layer of the dual layer, and the second common electrode 108B and the second pixel electrode 118B are formed as an upper layer of the dual layer.

As mentioned above, the first common electrode 108A and the first pixel electrode 118A are made of a transparent conductive material, and the second common electrode 108B and the second pixel electrode 118B are made of an opaque conductive material. The second electrodes 108B and 118B are formed narrower in width ($W_N$) than the first electrodes 108A and 118A in order to enhance the screen contrast ratio and luminance. Namely, the opaque second electrodes 108B and 118B are patterned to have a narrower width ($W_N$) than the width ($W_T$) of the transparent first electrodes 108A and 118A.

In other words, the width ($W_N$) of the opaque second electrodes 108B and 118B is narrower than the width ($W_T$) of the transparent first electrodes 108A and 118A, and the width ($W_D$) between the first electrodes 108A and 118A and the second electrodes 108B and 118B affects the increase in the white luminance at the transparent electrodes, namely, the first electrodes 108A and 118A.

The common electrodes 108A and 108B and the pixel electrodes 118A and 118B of the dual-layer can be formed as thin as possible in consideration of the resistance of the total thickness. In this case, the transparent first electrodes 108A and 118A can have a thickness of 100~2000 Å and the opaque second electrodes 108B and 118B can have a thickness of 100~3000 Å in order to block an abnormal light at the central region of the transparent electrodes 108A and 118A.

Meanwhile, one end of the pixel electrodes 118A and 118B is electrically connected to the pixel electrode line 118L through the first contact hole 140A to receive a pixel voltage, and one end of the common electrodes 108A and 108B is electrically connected to the common electrode line 108L through the second contact hole 140B to receive a common electrode.

Figure 5D:
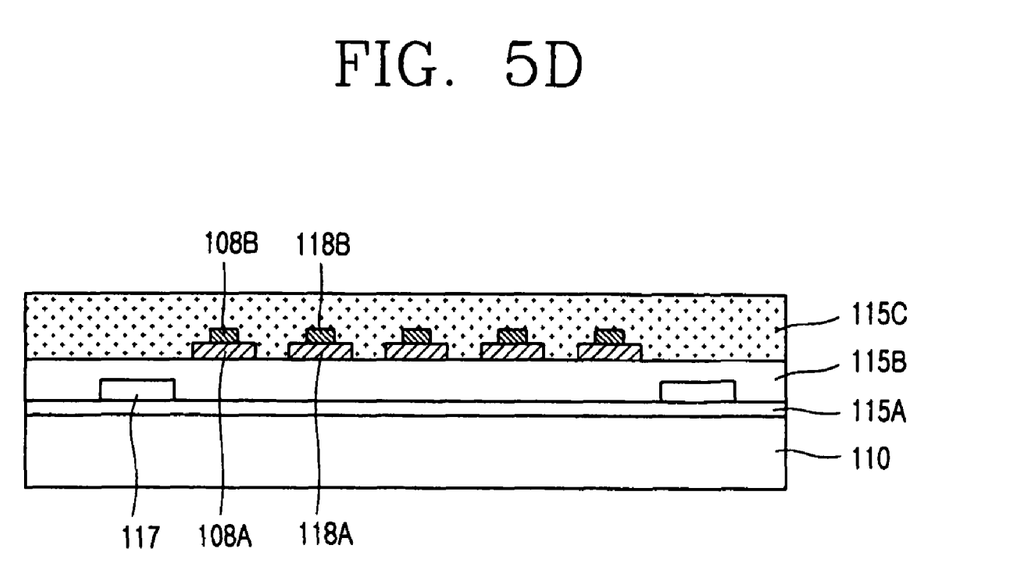

Thereafter, as shown in FIG. 5D, a third insulation film 115C (a planarization film) is formed at the entire surface of the substrate 110 including the common electrodes 108A and 108B and the pixel electrodes 118A and 118B.

In a preferred embodiment of the present invention, the common electrode and the pixel electrode are each formed as a dual layer of transparent electrode and opaque electrode. But in another embodiment the common electrode and the pixel electrode can be formed as a triple (or greater number) layer so long as the width of the opaque electrode is narrower than the width of the transparent electrode. In addition, only one of the common electrode and the pixel electrode can be formed as the dual layer or the triple (or greater number) layer.

The common electrode and the pixel electrode made of a conductive material and formed as a dual (or greater number) layer are stacked and patterned in the same process, so that a uniform interval is provided between the electrodes so as to enhance picture quality.

In a preferred embodiment of the present invention, the transparent electrode is used as the first electrode (the lower electrode) and the opaque electrode is used as the second electrode (the upper electrode). But, the present invention is not limited thereto and the opaque electrode can be used as the lower electrode and the transparent electrode can be used as the upper electrode, which will now be described in detail as follows.

Figure 7A:
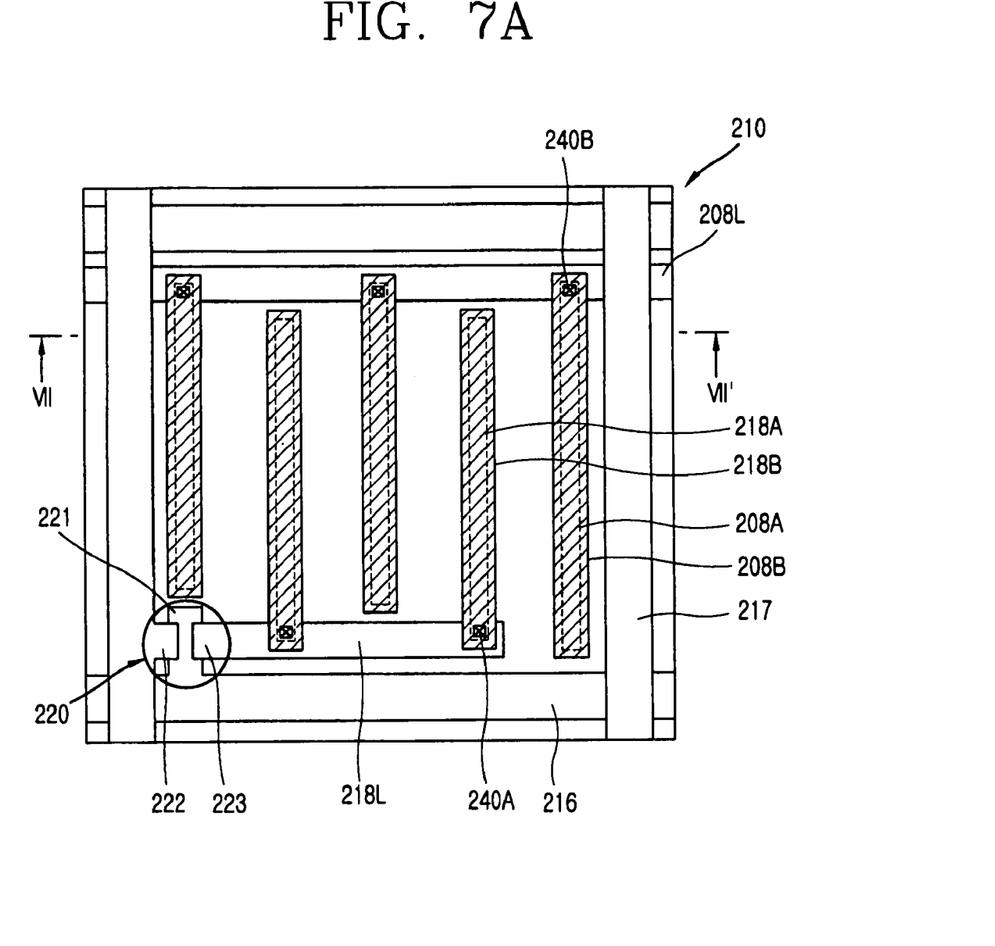
FIG. 7A is a plan view showing a portion of an array substrate of an IPS mode LCD in accordance with a second embodiment of the present invention.
Figure 7B:
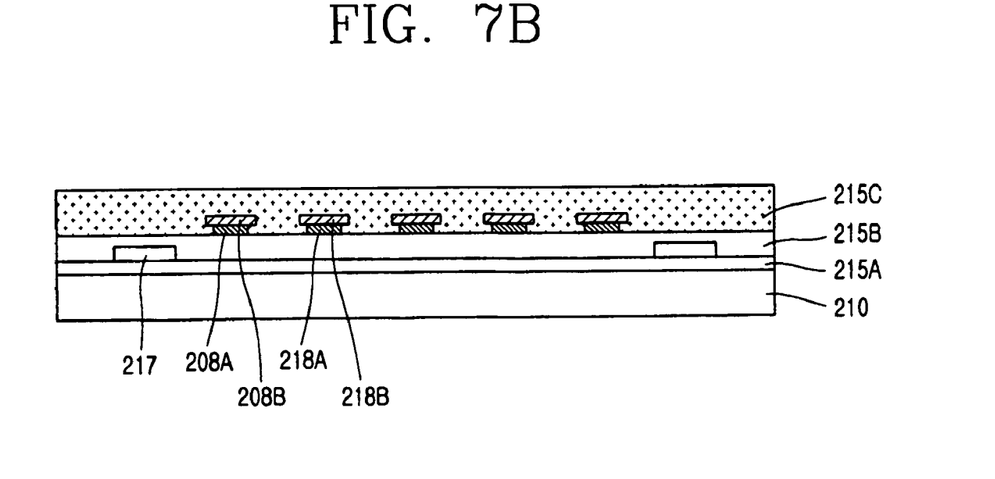
FIG. 7B are sectional view taken along line VII-VII' of the array substrate of FIG. 7A.

FIG. 7A is a plan view showing a portion of an array substrate of an IPC mode LCD in accordance with a second embodiment of the present invention, and FIG. 7B is a sectional view taken along line VII-VII' of the array substrate of FIG. 7A.

An array substrate of the second embodiment of the present invention has the same construction as that of the first embodiment except for the structure of the common electrode and the pixel electrode. Thus, the description on the same construction is omitted or brief and only the common electrode and pixel electrode will be described.

As shown in FIG. 7A, a gate line 216 and a data line 217 defining a pixel region are formed vertically and horizontally on a transparent glass substrate 210, and a TFT 220 is formed at the crossing of the gate line 216 and the data line 217.

A common electrode 208A and 208B and a pixel electrode 218A and 218B each formed as a dual layer are alternatingly disposed to generate a horizontal electric field in the pixel region. The pixel electrode 218A and 218B are electrically connected with a pixel electrode line 218L connected with a drain electrode 223 through a first contact hole 240A, and the common electrode 208A and 208B is electrically connected with a common electrode line 208L disposed in parallel to the gate line 216 through a second contact hole 240B.

The common electrode 208A and 208B and the pixel electrode 218A and 218B can have such a dual-layer structure in that an opaque electrode is used for the first common electrode 208A and the first pixel electrode 218A positioned at the lower side thereof, and a transparent electrode is used for the second common electrode 208B and the second pixel electrode 218B. In this respect, the opaque electrodes 208A and 218A can be narrower in width than the width of the transparent electrodes 208B and 218B.

The common electrode 208A and 208B and the pixel electrode 218A and 218B with the dual layer structure will be described through a section of the array substrate in detail as follows.

As shown in FIG. 7B, a first insulation film 215A is formed at the entire surface of the array substrate 210 and a data line 217 is formed on the first insulation film 215A.

A second insulation film 215B is formed on the first insulation film 215A including the data line 217, and the common electrode 208A and 208B and the pixel electrode 218A and 218B of a dual layer structure are alternatingly formed at an image display region of the second insulation film 215B.

A third insulation film 215C is formed on the common electrode 208A and 208B and the pixel electrode 218A and 218B.

The common electrode 208A and 208B and the pixel electrode 218A and 218B are each formed as a dual layer composed of the first electrode 208A or 218A (lower electrode) made of an opaque conductive material, and the second electrode 208B or 218B (upper electrodes) made of a transparent conductive material. The first electrodes 208A and 218A (bottom electrodes) are narrower in width than the second electrodes 208B and 218B (top electrodes) so as to have the same effect as that of the construction of the first embodiment of the present invention.

In another embodiment of the present invention, the common electrode and the pixel electrode can have a zigzag form, which will now be described as follows.

Figure 8:
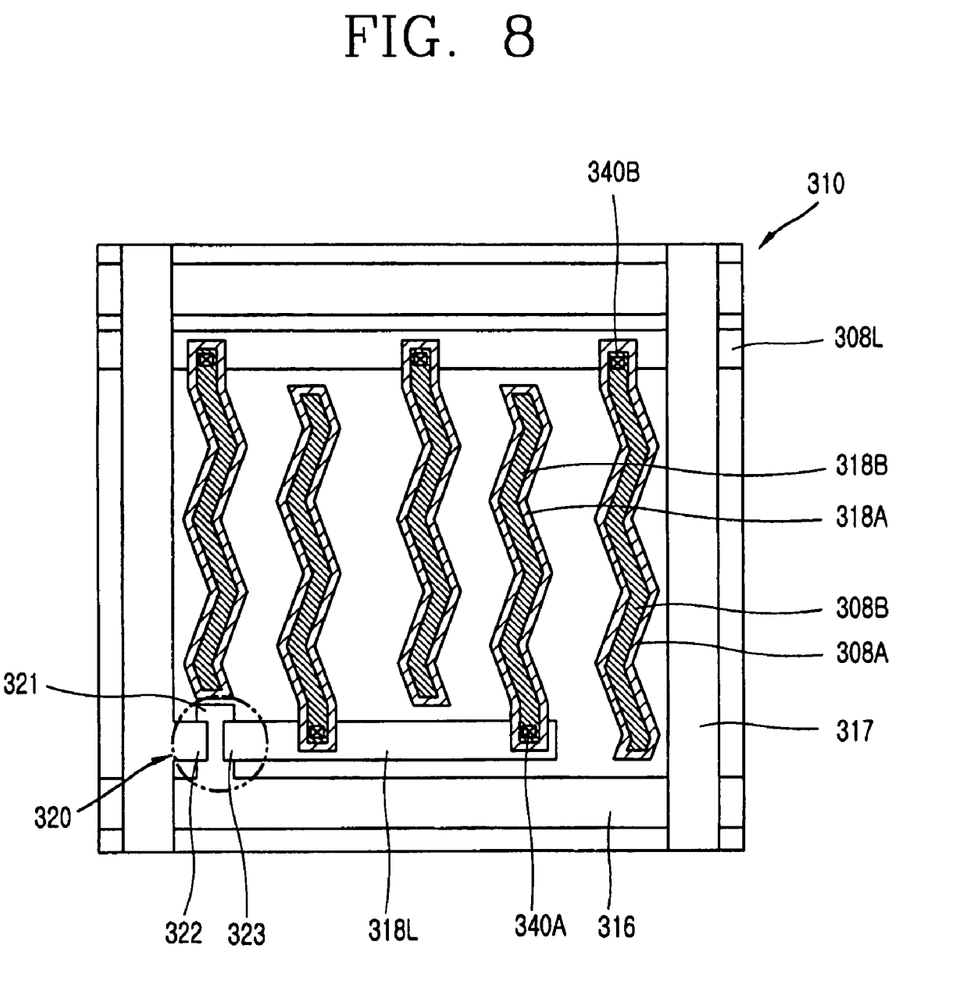
FIG. 8 is a plan view showing a portion of an array substrate of an IPS mode LCD in accordance with a third embodiment of the present invention.

FIG. 8 is a plan view showing a portion of an array substrate of an IPC mode LCD in accordance with a third embodiment of the present invention.

As shown, a common electrode 308A and 308B and a pixel electrode 318A and 318B each formed as a dual layer are alternatingly disposed in order to generate a horizontal electric field in a pixel region.

A transparent electrode is used as a first common electrode 308A and a first pixel electrode 318A positioned at a lower side of the dual layer, and an opaque electrode is used as a second common electrode 308B and a second pixel electrode 318B positioned at an upper side of the dual layer. The opaque electrodes 308B and 318B are formed narrower in width than the transparent electrodes 308A and 318A, thereby forming the dual layer structure.

The common electrodes 308A and 308B and the pixel electrodes 318A and 318B each have a zigzag form (or herringbone structure). With this zigzag form of the common electrodes 308A and 308B and the pixel electrodes 318A and 318B, liquid crystals positioned at one pixel are not all arranged in one direction but in mutually different directions, so that a multi-domain can be induced.

Namely, an abnormal light due to birefringence characteristics of the liquid crystal can be offset due to the multi-domain structure, and the color shift phenomenon can be minimized. In this case, the angle at the bent portion of the zigzag pixel/common electrode structure can be about 1~30° to a direction of the alignment of the liquid crystal.

Although FIG. 8 shows the zigzag pattern of the dual layer structure of the device of FIG. 2, the zigzag pattern may be applied to any dual or multi-level layer structure of the pixel/common electrodes, such as the dual structure of FIG. 7A.

As so far described, the IPS mode LCD of the present invention has many advantages.

For example, first, since the common electrode and the pixel electrode are formed as a dual layer of the transparent electrode and the opaque electrode, both the screen contrast ratio and luminance can be enhanced to enhance picture quality.

Second, by additionally forming the opaque electrode, a chuck stain generated in the 2ITO structure can be prevented and thus picture quality can be enhanced.

Third, since the common electrode and the pixel electrode have low resistance, the thickness of the electrodes becomes thin, and thus, with the reduced step of the electrodes, degradation of picture quality such as light leakage can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of forming a liquid crystal display (LCD), the method comprising:
providing first and second substrates;
forming a gate electrode, a common electrode line and a gate line on the first substrate, wherein the common electrode line is disposed in parallel to the gate line;
forming a first insulation film on the first substrate with the gate electrode, the common electrode line and the gate line formed thereon;
forming an active layer on the first insulation film;
forming a source electrode and a drain electrode on the active layer and forming a data line crossing the gate line to define a pixel region, wherein a portion of the drain electrode is extended to the pixel region to form a pixel electrode line;
forming a second insulation film on the first substrate with the source electrode, the drain electrode and the data line formed thereon;
forming a first contact hole exposing a portion of the pixel electrode line by removing a portion of the second insulation film;
forming a second contact hole exposing a portion of the common electrode line by removing a portion of the first and second insulation films;
forming an opaque metal layer on the second insulation film;
forming a transparent metal layer on the opaque metal layer;
forming a plurality of second common and pixel electrode patterns having a second width by selectively etching the transparent metal layer through a photolithography process;
forming a plurality of first common and pixel electrode patterns having a first width by over-etching the opaque metal layer through the said photolithography process,
wherein one end of a plurality of first pixel electrode patterns is electrically connected with the pixel electrode line through the first contact hole,
wherein one end of a plurality of first common electrode patterns is electrically connected with the common electrode line through the second contact hole,
wherein the first width is narrower than the second width,
wherein the first common and pixel electrode patterns and the second common and pixel electrode patterns are flat, and
wherein the first common and pixel electrode patterns are formed at a central portion to affect a region from an edge of the second common and pixel electrode patterns to a certain width (Wt) for enhancing a screen contrast ratio, and a width (Wd) between the second common and pixel electrode patterns and the first common and pixel electrode patterns affects an increase in the white luminance at the second common and pixel electrode patterns; and
forming a liquid crystal layer between the first and second substrates.

2. The method of claim 1, wherein the opaque metal layer has a lower resistance than the transparent metal layer.

3. The method of claim 1, wherein the first common and pixel electrode patterns and the second common and pixel electrode patterns are substantially parallel to the first and second substrates.

* * * * *